Dec. 7, 1948.   M. SCHWARTZ ET AL   2,455,814
PLATE HOLDER FOR PHOTOGRAPHIC APPARATUS
Filed April 28, 1945
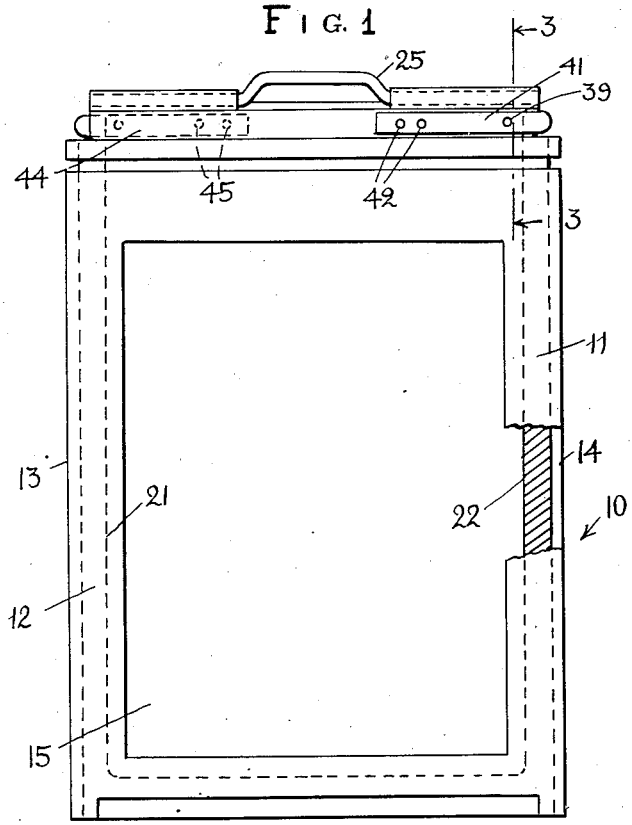
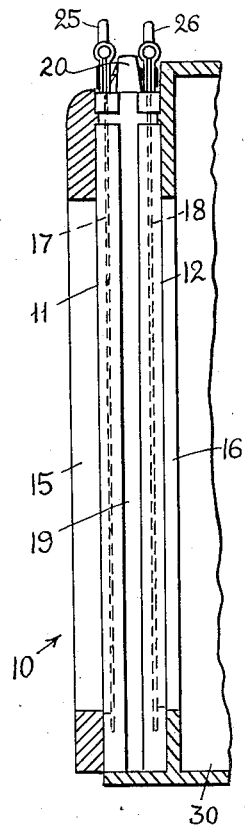
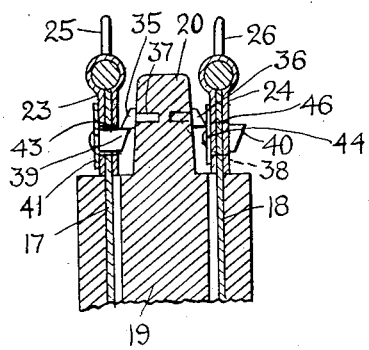
MORRIS SCHWARTZ
WILLIAM CASTEDELLO
INVENTORS Patented Dec. 7, 1948

2,455,814

UNITED STATES PATENT OFFICE 2,455,814

PLATEHOLDER FOR PHOTOGRAPHIC APPARATUS

Morris Schwartz and William Castedello, Stamford, Conn., assignors to The Kalart Company, Inc., Stamford, Conn.

Application April 28, 1945, Serial No. 590,932

1 Claim. (Cl. 95—71)

This invention relates to plate holders for photographic apparatus such as cameras of any description, particularly to plate holders of a type in which the sensitized plate placed in the plate holder is normally covered by a dark slide which is removed for exposure and replaced after completed exposure.

Plate holders of this type are usually provided with a marking such as a contrasting strip at one side while the other side of the slide is left unmarked. The purpose of such contrasting marking is to indicate to the photographer whether a plate covered by the slide has been exposed. The photographer may then turn the unmarked face of the slide to the outside when the plate holder is loaded with an unexposed plate and reverse the slide when replaced after exposure so that the marked face of the slide is now at the outside. Practical experience shows that in a certain number of cases the photographer will forget to reverse the slide after exposure or disregard the fact that the marked side is at the outer side.

Several locking devices are known in the art for locking a slide covering an exposed plate. However, most devices hitherto known require a manual operation by the photographer thereby entailing a certain number of errors and oversights on the part of the photographer.

One object of the invention is to provide a novel and improved locking device which does not require a manual operation by the photographer but will lock the slide after a reversal following exposure automatically in a fully inserted position thereby avoiding an accidental double exposure of a plate.

Another object of the invention is to provide means permitting an intentional removal of a reversed slide after exposure by additional manipulation for instance in the dark room or when the photographer desires to make a double exposure, for example for purposes of trick photography.

Another object of the invention is to provide a novel and improved locking device which is not dependent on diligence and attention of the photographer and hence is fool proof for all practical purposes.

Other and further objects and advantages of the invention will be described hereinafter and set forth in the appended claim, forming part of the application.

The present application is a continuation in part of our co-pending application Ser. No. 369,600, filed December 9, 1940, now Letters Patent 2,396,889, granted on March 19, 1946.

In the accompanying drawings two embodiments of the invention are shown by way of illustration and not by way of limitation.

Fig. 1 is a front view of a plate holder according to the invention for a camera.

Fig. 2 illustrates how the plate holder shown in Fig. 1 is held on the camera, and Fig. 3 is an enlarged sectional view of the upper part of the plate holder taken along line 3—3 of Fig. 1.

The plate holder which has been illustrated in the drawings and is described hereinafter is a conventional plate holder of the duplex type. In this connection it should be noted that the term "plate holder" as herein used also includes holders for films. In the event that a film is employed, a sheath is provided to receive the film, the sheath with the film being placed in the holder in the usual manner. It is only essential for the application of the invention that the plate or film holder has one or more slides which are removed for the exposure of the plate or film and replaced after exposure.

Referring now to Figs. 1, 2 and 3 in detail the plate holder shown in these figures comprises a substantially rectangular container made of any suitable material impervious to light such as wood, plastic, metal, etc. The plate holder container, generally designated 10, is formed by two side plates 11 and 12 joined by means of walls 13 and 14. Each of the side plates has the usual openings 15 and 16 which are normally covered by dark slides 17 and 18 respectively. The plate holder container is subdivided by a partition wall 19 in order to provide for the reception of two plates in the holder. The partition wall has an extension 20 which as best seen in Fig. 3 is extended beyond the upper edges of side walls 17 and 18. In each of the walls 13, 14 or in the material of the side plates 11, 12 grooves 21, 22 are provided as can be best seen in Fig. 1. These grooves serve to guide the dark slides and to hold them in their positions in the plate holder.

The upper ends of the slides are extended over the upper edge of the container itself and are provided with a U-shaped member 23, 24 respectively secured to the protruding part of each slide. These U-shaped members may be fastened to the slides by any suitable means and support handles 25, 26 respectively to facilitate removal of the slides from the holder and replacement thereof. One side of the U-shaped members or of the dark slide itself is preferably marked differently from the other slide in order to enable the photographer to see whether the plate covered by the slide has been exposed. In practice the photographer will usually insert a slide into the plate holder in such a manner that the dark or unmarked side of the slide faces outwardly and reverse the slide after the plate covered by the slide has been exposed. The mark, for instance a colored or silvered strip on the slide holder will then indicate that such slide covers an exposed plate (Fig. 6, at 68 shows such contrasting marking).

The plate holder as has been hereinbefore described is conventional, and it should of course be understood that the plate holder may be provided with the usual lining for protecting the sensitized plate against the intrusion of unwanted light and with means to facilitate the insertion and removal of the plate in the dark room such as a hinged bottom section of the plate holder container. Since the structural details of the plate holder as such are not part of the invention they are not described herein in detail.

The plate holder after being loaded is inserted in the casing of the camera body 30 part of which is diagrammatically shown in Fig. 2 and is held in this position by the usual guiding and locking means provided at the camera casing.

According to the invention which will be now described a locking means is provided which automatically, that is without manual operation by the photographer, prevents an accidental removal of the slide after an exposure has been made and the slide has been replaced after a reversal of the slide position as previously explained.

For this purpose noses or projections 35 and 36 respectively are provided at each side of the extension 20 of partition wall 19. These noses may be fastened to the extension 20 by any suitable means such as pins 37, 38 respectively. They coact with corresponding noses 39 and 40 respectively. Nose 39 is supported near one end by a spring 41, the other end of which is fastened by rivets 42 or other suitable means to the section of slide 17 extending above the edge of the plate holder walls. Nose 39 penetrates through an opening 43 provided in the slide 17 leaving sufficient clearance for a free movement of nose 39.

Nose 40 is similarly supported by a spring 44 which is fastened by rivets 45 to the other slide 18 and penetrates through an opening 46 in the upper part of slide 18, opening 46 permitting a free movement of nose 40. Both noses 39 and 40 are so arranged that they extend from the unmarked side of the slide. As previously explained it is the customary practice to turn this side outwardly when and as long as the plate for film placed in the holder is unexposed. Slide 18 is shown in Fig. 3 in such "unexposed position." As will be seen in this position noses 36 and 40 cannot engage each other, nose 40 being at the outside. Consequently slide 18 can be freely inserted into the plate holder in the dark room and also freely removed from the plate holder for an exposure. When now after exposure the slide is replaced after reversal so that the marking of the slide is at the outside and hence visible, nose 40 will be at the inside. Fig. 3 shows slide 17 in such "exposed position." As will be apparent from the previous explanations the yielding spring support of nose 40 will permit an insertion of the slide 18 after reversal since the nose 40 will simply be forced aside against the action of its spring support 44 while nose 40 is passing nose 36. This passing of the noses can be facilitated by suitably slanting the noses as shown in Fig. 3. However, when the slide has been fully inserted nose 40 will engage the lower edge of nose 36 thereby automatically and effectively preventing an unintentional or accidental second removal of the slide. (See position of noses 35, 39 of slide 17.)

When the slides shall be removed in the dark room it is only necessary to lift springs 41 and 44 sufficiently to permit the respective noses 39 and 40 to clear noses 35 and 36.

While the invention has been described in detail with respect to certain particular preferred examples and embodiments it will be understood by those skilled in the art after understanding our invention that various changes and modifications may be made without departing from the spirit and scope of our invention, and it is intended therefore, in the appended claim to cover all such changes and modifications.

What is claimed as new and desired to be secured by Letters Patent is:

Plate holder of the type described for photographic apparatus comprising a nose fastened to the plate container of the holder near the upper edge thereof, a second nose inserted in a hole provided in the plate holder slide, and a spring supporting the second nose and biasing the same to extend through said hole from one side of the slide, said spring being fastened to the slide opposite to the side from which the second nose projects, said two noses being mounted in a relative position in which they are removed from each other when the slide is inserted in a position in which one of the slide faces faces in a predetermined direction, thereby permitting a free passage of the slide in the said position, and engage each other when the slide is inserted with the same slide face in the opposite direction, thereby locking the slide in such opposite face position, said spring being arranged to permit a withdrawal of the second nose through said hole and from its position engaging the other nose.

MORRIS SCHWARTZ.
WILLIAM CASTEDELLO.

REFERENCES CITED

The following references are of record in the file of this patent:

UNITED STATES PATENTS

| Number | Name | Date |
| --- | --- | --- |
| 267,821 | Barker | Nov. 21, 1882 |
| 484,569 | Pierce | Oct. 18, 1892 |
| 1,195,062 | Miles | Aug. 15, 1916 |
| 1,954,917 | Burnell | Apr. 17, 1934 |
| 1,954,918 | Burnell et al. | Apr. 17, 1934 |

FOREIGN PATENTS

| Number | Country | Date |
| --- | --- | --- |
| 32,317 | Sweden | Feb. 17, 1912 |